United States Patent [19]

Huber

[11] Patent Number: 5,029,928
[45] Date of Patent: Jul. 9, 1991

[54] PICKUP TRUCK BED SEAT

[76] Inventor: John G. Huber, 2204 Greenfield Rd., Winchester, Va. 22601

[21] Appl. No.: 528,537

[22] Filed: May 25, 1990

[51] Int. Cl.⁵ .............................................. B60N 2/24
[52] U.S. Cl. .................................. 296/63; 296/37.15; 297/DIG. 3; 297/437; 297/284
[58] Field of Search .............. 296/63, 64, 37.15; 297/457, 284, DIG. 3

[56] References Cited

U.S. PATENT DOCUMENTS

| | | | |
|---|---|---|---|
| 2,623,574 | 12/1952 | Damsch | 297/DIG. 3 X |
| 3,093,407 | 6/1963 | Wilson | 297/DIG. 3 X |
| 3,112,956 | 12/1963 | Schick et al. | 297/DIG. 3 X |
| 3,151,909 | 10/1964 | Gerdetz | 297/457 |
| 3,606,457 | 9/1971 | Reay | 297/DIG. 3 X |
| 3,840,263 | 10/1974 | Bowden | 296/64 X |
| 4,589,695 | 5/1986 | Isono | 297/DIG. 3 X |
| 4,627,659 | 12/1986 | Hall | 297/485 X |
| 4,905,332 | 3/1990 | Wang | 297/DIG. 3 X |

Primary Examiner—Margaret A. Focarino
Assistant Examiner—Gary C. Hoge
Attorney, Agent, or Firm—John B. Dickman, III

[57] ABSTRACT

A folding, solid polyfoam cushioned or inflatable seat for a pickup truck bed with a removable seat belt assembly that may be an integral part of the installed seat. The hinge arrangement permits the seat to move from upright to inclined, and allows installation in a variety of pickup bed sizes. The seat has an attaching support which connects to the truck for easy removal and reinstallation.

The seat can be used out of the pickup bed, for example on the beach, picnicking, and the like.

8 Claims, 4 Drawing Sheets

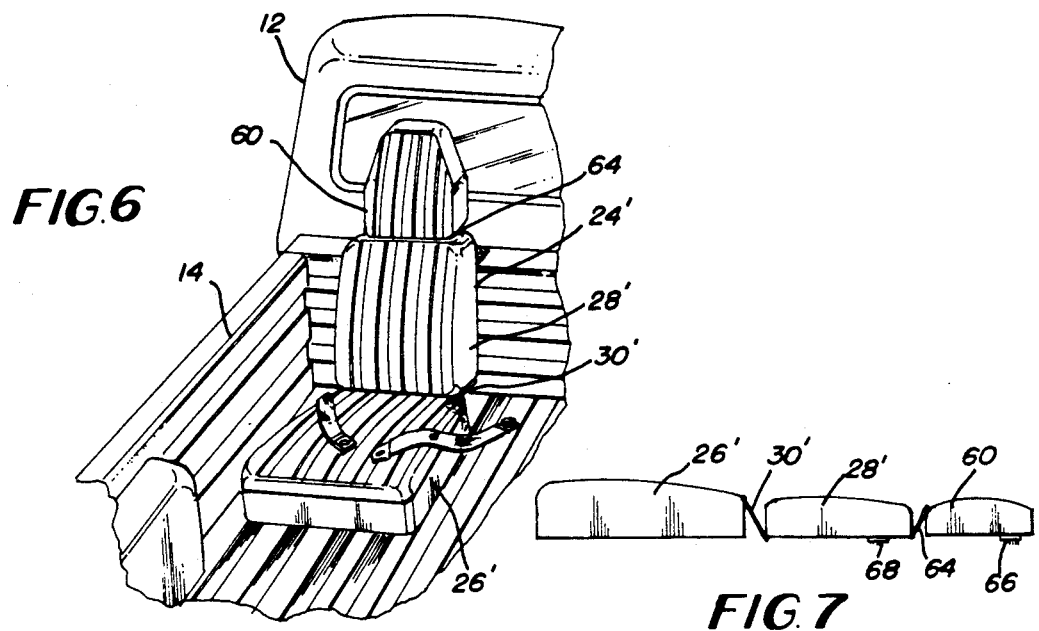
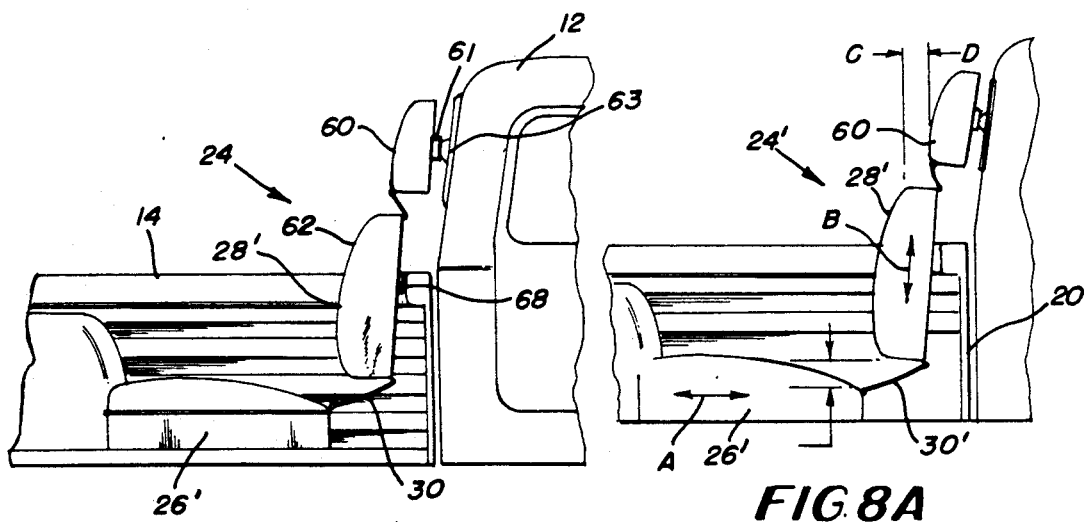
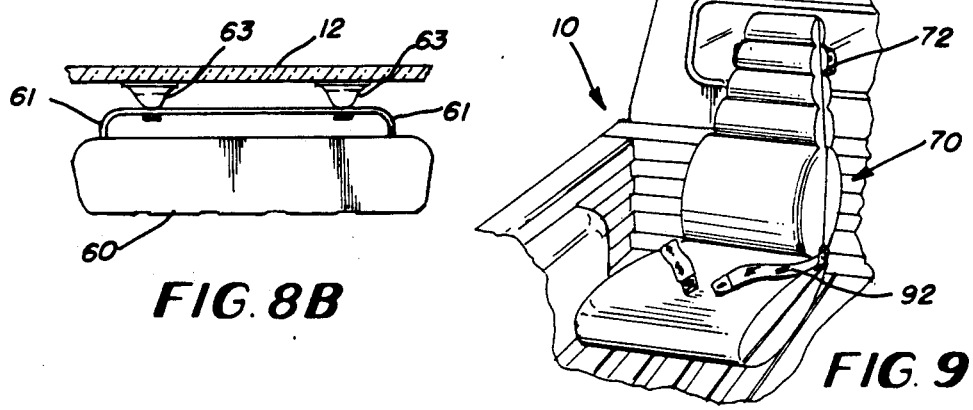

PICKUP TRUCK BED SEAT

BACKGROUND OF THE INVENTION

This invention relates to a seat for pickup truck beds, recreational vehicles, or work vehicles and more particularly, a foldable or inflatable seat cushion with a seat belt that may be an integral part of the installed seat. The seat utilizes the pickup bed floor and side for structural support and can be installed at a reasonable cost in the full range of pickup bed sizes. Pickup trucks are purchased by many people not as a working vehicle for hauling, but as sports and utility vehicles, and for personal transportation. Most pickup trucks are equipped with only two or three passenger seats, therefore, at times, pickup owners choose to carry passengers in the truck bed. The dangers to passengers are well known to the public, yet most owners do not invest in seats for the truck bed for reasons of loss of cargo capacity, inconvenience of installation and removal, and cost.

Truck beds have a corrugated floor which is intended to give support and rigidity, while being flexible enough when traveling over rough terrain. The truck beds also have sides and a tailgate. Also there are wheel wells within the truck bed, which are quite often used as seats. However, the dangers of riding anywhere in a truck bed are well known and documented. Even sitting on the floor is dangerous, when turning or coming to a fast stop. Injuries are common when a passenger is thrown around in the bed of a pickup. Most fatal injuries are the result of passengers being thrown out of the pickup bed. Some states have laws prohibiting passengers in pickup beds unless they are wearing approved seat belts.

To make riding in a pickup truck bed safer and comfortable, some truck owners install seats. Normally, these seats are permanently installed, taking up about a third of the truck bed space. When, and if, the space is needed for hauling, the seats must be unbolted and stored, and then reinstalled. In addition, for the most part, seat belts are not supplied with the seats. The invention overcomes the inherent problems of the present seats, by providing a seat that is easy to install and remove, it folds or deflates to a conveniently small size, has a headrest, and is supplied with an approved quickly removable seat belt that may be an integral part of the installed seat package.

SUMMARY OF THE INVENTION

In general, the seat of this invention is particularly constructed for installation in the bed of a pickup truck. In one embodiment, the seat has a unique hinge structure which gives the passenger greater lower back support. The hinge has a pivoting arrangement which allows for a better lower back support in an inclined position than previous hinge arrangements. The hinge arrangement also allows the seats to be installed in pickup beds with varying bed side heights.

Another feature of the seat is the way in which it securely attaches to the truck bed without being permanently installed. The top edge of the seat back attaches to the top or side surface of the truck bed side using a fastener system that provides quick release for easy removal. Once the seat is removed from the truck side, it folds into a compact bundle which can be easily stored.

In one embodiment of the seat, a head rest is mounted on the truck cab. The head rest, like the seat, is easily removed for storage. A different preferred head rest arrangement is contemplated in another embodiment, where the headrest is hinged to the seat back. The hinge arrangement is similar to the arrangement connecting the back to the seat, and allows the headrest to fit pickups with varying distances between the front bed side and the passenger cab.

A second embodiment of the seat is an inflatable version made of rubberized canvas, vinyl or similar material. The inflatable seat cushion can be reversible with different colors and visual effects on each side. Another feature of the inflatable seat is that it has inflatable chambers designed to cushion the top edge of the bed side. This seat also may have a separate or an integral headrest, or no headrest. In this embodiment, the inflatable seat adjusts to varying truck bed heights by its unique multi-holed attachment tabs and the removable seatbelt may also retain the seat cushion.

Another embodiment has adjustable or multi-position straps attached to the seat and to the fastening part in the truck bed and does not use the seatbelt for retaining the seat. Still another embodiment has the seatbelts permanently bolted to the floor of the truck bed and the seatbelt is passed through wider slits in the retaining tabs to hold the seat in place.

Another embodiment of the inflatable seat has built-in or inflatable adjustable thigh supports. There can be provided pockets in the flap connecting the thigh support to the seat for holding drinks, keys, etc.

In some cases it may be necessary to provide an abrasion protector for the inflatable seat. The protector can be integral or separate.

Other features of the invention will become apparent from the drawings, description and the claims.

DESCRIPTION OF THE DRAWINGS

FIG. 6 is a perspective view of another embodiment.

FIG. 7 is a side view of the embodiment shown in FIG. 6.

FIG. 8 is a side view of the embodiment of the invention shown in FIG. 6.

FIG. 8A is another side view of the embodiment of FIG. 8.

FIG. 8B is a top view showing a headrest of FIG. 8.

FIG. 9 is a perspective view of an inflatable seat embodiment of the invention.

DESCRIPTION OF THE INVENTION

Figures 1, 2, 3, 4, 5:
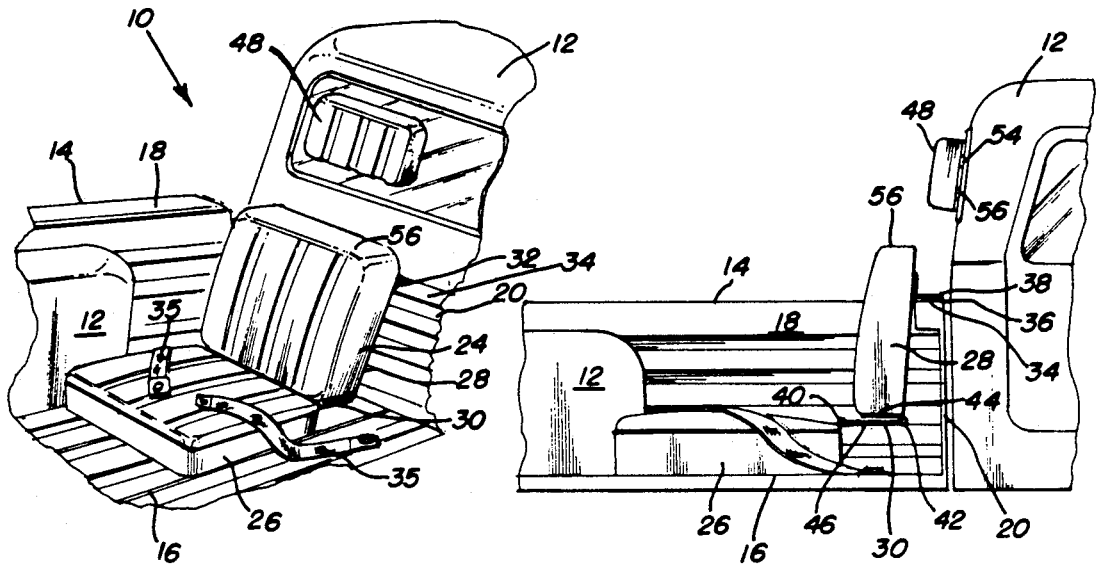
FIG. 1 is a perspective view of a seat of the present invention.
FIG. 2 is a side view of a seat of the invention shown in FIG. 1.
FIG. 3 is a side view of the seat in FIG. 2 in a reclined position.
FIG. 4 is a perspective view of a seat of the invention in a folded position.
FIG. 5 is a side view of the primary embodiment of the invention.

Referring to the drawings, FIGS. 1-18, there is shown a pickup truck 10 with a cab 12 and a truck bed 14. Cab 12 is the enclosed driver and passenger compartment with doors and windows, not shown. Truck bed 14 has a corrugated floor 16 and side walls 18, only one being shown, and front bed side 20. There are a pair of wheel wells 22, again one is shown, and a tail gate, not shown. The pickup truck is shown in a partial perspective view, since the subject seat 24 is fully shown without the need to show a complete truck.

FIG. 1 shows a seat 24 facing the rear of truck 10. The seat 24 has a lower seat cushion 26 and a back cushion 28 connected by a hinge 30. Seat 24 may be stuffed with a plastic foam, an inflatable seat filled with air, a combination of foam padding and inflated air chambers or some other seat padding. The seat 24 is only attached to the truck bed 14 at 32 on the top surface 34 of front bed side 20. There are seat belts 35 to prevent the passenger or passengers from being accidentally thrown out of or thrown around in the truck bed.

Turning to FIG. 2, attachment 32 has mating "Velcro" strips 36 and 38. Velcro is a trademark of the 3M Company, other manufacturers make the same product with the generic name of "hook and loop fasteners". Hereinafter, we will use Velcro and hook and loop fasteners interchangeably. One strip 36 is secured to the top surface 34 of the front bed side 20. The other strip 38 is attached near the top of seat back 28. Therefore, when the seat 24 is pulled forward, as in FIG. 3, the hinge 30 and attachment 32 permit the seat back 28 to recline forming a longer back support, which will be explained in detail. Other quick release fastener systems will be obvious to one well versed in the art.

Hinge 30 attaches seat cushion 26 to back cushion 28. The hinge 30 comprises an arm 46, with ends 40 and 42, as shown in FIGS. 2, 3 and 6. End 40 of the hinge arm 46 is pivotally connected to top rear edge of seat cushion 26 and end 42 is pivotally connected to the lowest back edge of back cushion 28. With such a hinge arrangement, the seat 24 can be in an upright position as in FIGS. 1 and 2, or in a reclined position as in FIG. 3. In FIG. 2, the back cushion 28 is supported only by attachment 32. In other words, the back cushion does not rest on the seat cushion 26. In order for the back cushion 28 and the seat cushion 26 to form a good lower back support in the upright position, the length of the hinge arm 46 has to be about or longer than the width 44 of the lower back support. If the hinge arm 46 is a lot longer than the seat width 44, the back cushion would range from vertical to a reverse angle. Either situation provides good back support. Should the length of the hinge arm 46 be less than the width 44 of the lower back cushion, the effective length of the seat cushion 26 is shortened. More importantly, the length of the hinge arm 46 is important when the seat is reclined as in FIG. 3 and in compactly folding up the seat as shown in FIG. 4. With the length of the hinge arm 46 being about or longer than the width 44 of back cushion 28 a passenger receives full back support. A person's lower back rests on the lower surface of the back cushion 28, and the pelvis supported on the seat cushion 26, with the whole back being well supported.

FIG. 5 shows the seat 24 laid flat with the seat cushion 26 connected by hinge arrangement 30 to seat back 28. Half of the Velcro attachment 38 is attached near the upper edge of the back cushion 28 for attaching the seat back 28 to the top surface 34 of the truck bed.

A head rest 48 is shown in FIGS. 1, 2, 3 and 5. The head rest 48 attaches to the rear of the truck cab 12 by Velcro strips 50 secured to the rear glass by suitable means (FIG. 4). There are matching velcro strips or hook and loop fasteners 52 on the back of the head rest (FIG. 1-A), so that the head rest 48 is easy to install and remove. In place of the matching Velcro strips, suction cups may be placed on the headrest, to attach same to the rear of the truck cab.

FIG. 4 shows the seat 24 folded in a compact out-of-the-way off-the-floor package. Velcro strips 54 and 56 match the strips 52 on headrest 48 (FIGS. 4 and 5) so when the cushion 26 and 28 are held together as in FIG. 4. This seat can be quickly and easily folded and/or removed if the truck bed is needed for hauling cargo. And just as easily re-installed for hauling extra passengers.

Turning to the embodiment in FIGS. 6 and 7, the seat 24' has a seat cushion 26' and a back cushion 28' connected by a hinge arrangement 30'. A headrest 60 is connected to the back cushion 28' by a hinge 64 similar to hinge arrangement 30', except that the hinge 64 connects to the lower front of the headrest and to the top rear of the back cushion as shown in FIG. 7. The headrest 60 has a velcro strip 66 which attaches to a velcro strip on the truck cab 12. A velcro strip 68 can also be located on the seat back for attachment to the pickup truck bed side. Again, other quick release fasteners could be used instead of the velcro, for example, suction cups, snap buttons, etc.

The embodiment in FIG. 8 is similar in detail to the embodiment shown in FIGS. 6 and 7, with the exception of using suction cups 63 on headrest 60, instead of velcro strips 66. In FIG. 8A, the seat 24 is shown to accommodate different truck bed heights. To adjust to the different heights the hinge 30', between the back rest 28' and seat 26', pivots to extend the height of the seat, as indicated by arrows A and B. Also in FIG. 8A, the headrest 60 is shown to accomodate a different distance between front bed wall 20 and cab 12, indicated by arrows C and D.

Figure 10:
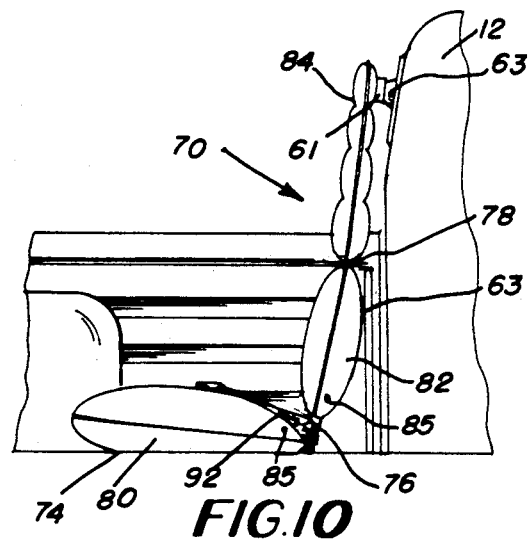
FIG. 10 is a side view of the embodiment shown in FIG. 9.
Figure 11:
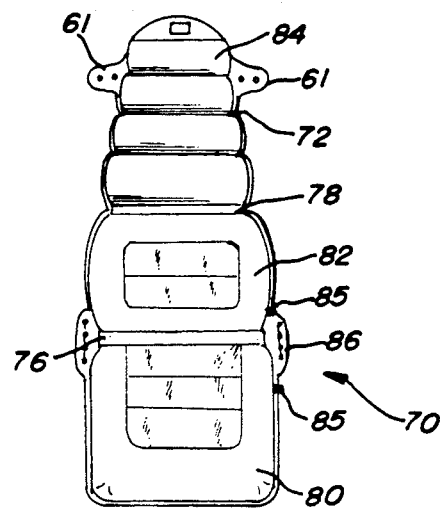
FIG. 11 is a front view of the embodiment shown in FIG. 9 in a flat uninflated position.

FIG. 8B is a top view of another embodiment of a headrest 60 showing ears 61 with suction cups 63, the suction cups hold the headrest 60 to the back window of the truck cab 12. Ears 61 are also shown in FIG. 10. While the suction cups or velcro strips hold the seat in place, the passenger is held in place by a seat belt 35.

The embodiment shown in FIGS. 9-18 represents an air-inflatable version of the truck bed seat. A one piece seat 70, with air inflatable partitions and hinge areas 76 and 78 define a seat cushion 80, a back rest 82 and head rest 84. Air valves 85 are provided for filling and deflating. The seat 70 is held on the truck bed by its attachment tabs 86 slipped over eyelet bolts 94 and secured by seatbelt 92, shown in FIG. 14. The headrest 84 is held on the cab 12 by suction cups 63 and/or by velcro strips.

The inflatable seat 70 can be easily and quickly removed, then to be deflated and stored in the truck cab, to allow full utilization of the pickup truck bed for cargo.

Figure 12:
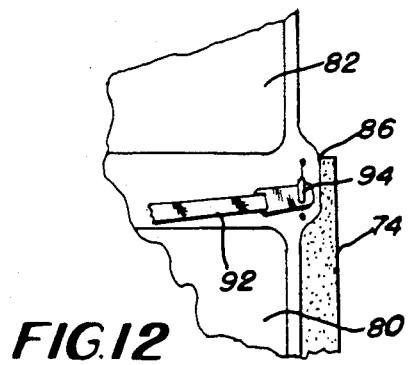
FIG. 12 is a front view of a seat belt attaching means of the invention.
Figure 13:
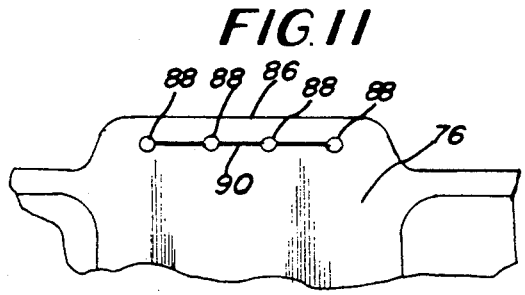
FIG. 13 is a detail view of the seat belt attaching means of FIG. 12.
Figure 14:
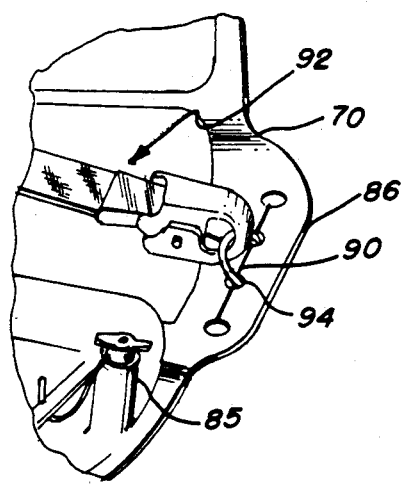
FIG. 14 is a perspective view of the seat belt arrangement of FIG. 13.

Looking at FIGS. 12 and 13, the seat 70 has tabs 86 which extend from the hinge 76 between seat cushion 80 and backrest 82. Holes 88 are located in the tabs 86 which can be connected by a single slit 90 between any two adjoining holes, as in FIG. 13. The purpose of alternate slits 90 is to provide adjustments to fit the range of truck bed heights. The seat belt 92, FIG. 12, holds the passenger in place and also serves to retain the seat tabs 86 placed over the eyelet bolts 94 by means of the slit 90 shown in FIG. 14. The eyelet bolt 94 is connected to the truck bed. Other types of fasteners could be used in place of eyelet bolt 94, for example, cargo tiedown D-rings.

Figure 15:
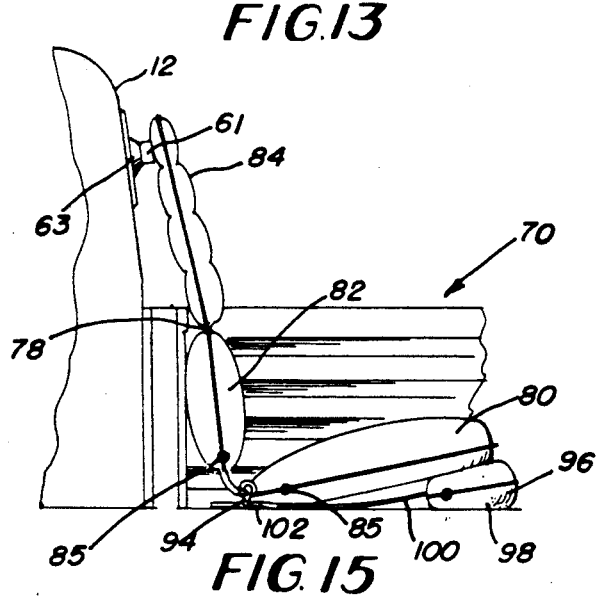
FIG. 15 is a side plan view of an inflatable seat with a separate thigh support.
Figure 16:
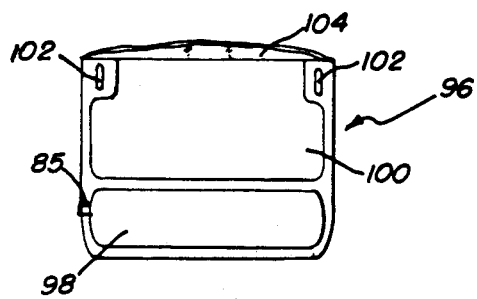
FIG. 16 shows a front view of an inflatable support and storage bag.

A further embodiment of the inflatable seat 70 is shown in FIGS. 15 and 16 where a passenger's thigh support cushion 96 raises the front of the seat cushion 80 for greater comfort. The thigh support cushion 96 has an inflatable pillow 98 attached to a protective mat 100. The height of the cushion 96 can be raised or lowered by the amount of air pumped into the pillow. The protective mat 100 protects the seat 70 against rough or dirty surfaces of a truck bed. The protective mat 100 has slits 102 for slipping over the eyelet bolts 94 to hold the cushion 96 under the seat 80, and has a pocket 104 for storing the deflated and folded seat 70.

Figure 17:
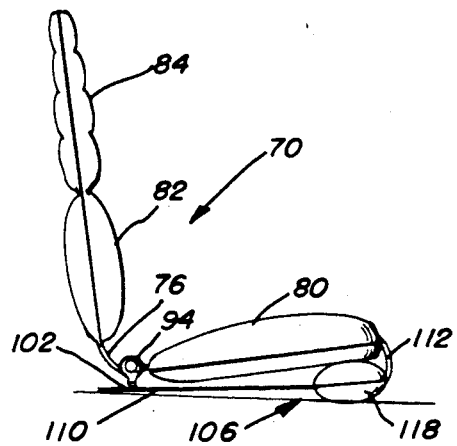
FIG. 17 is a side view of a modification showing a built-in adjustable inflatable thigh support.

Another embodiment of the thigh support cushion is shown in FIG. 17 where cushion 106 has an inflation pillow 108, a protective mat 110, a connection flap 112 to attach the cushion 106 to seat cushion 80, and slits 102 in protective mat 110 as well as in hinge 76 to be slipped over eyelet bolt 94.

Figure 18:
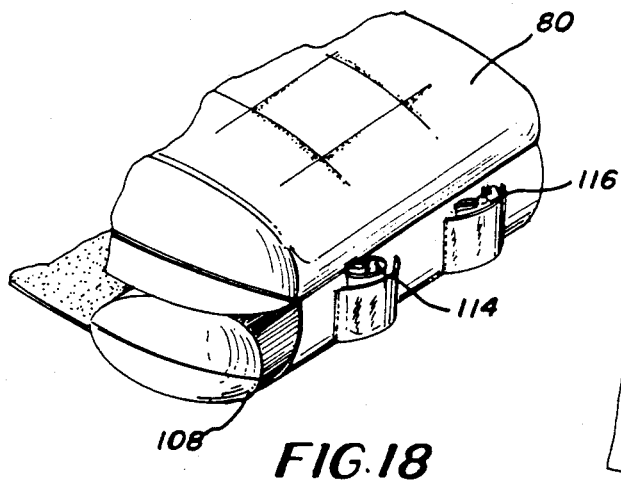
FIG. 18 is a modification of the inflatable thigh support showing storage pockets.

In FIG. 18, the flap 112 is provided with pockets 114 and 116 to hold personal articles and/or beverage containers.

Figure 19:
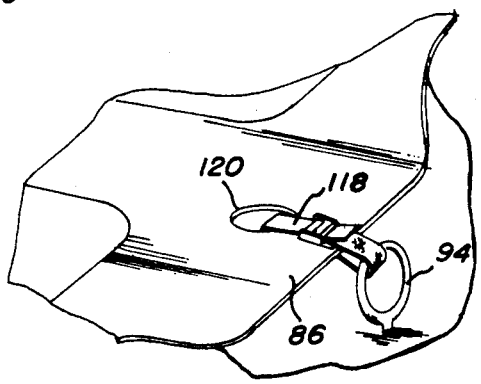
FIG. 19 shows one way of attaching seat to truck bed.
Figure 20:
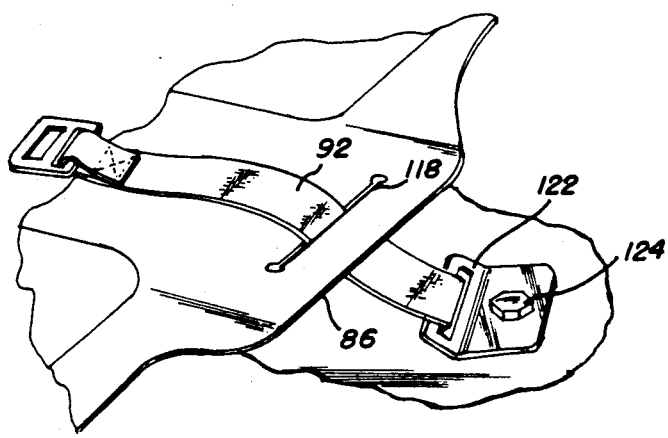
FIG. 20 shows another way of attaching seatbelt to truck bed.

FIG. 19 shows the embodiment in which the seat is held in the bed of the truck by strap 118 engaging eyebolt 94 and slit 120 in tab 86. FIG. 20 shows the seatbelt 92 passing through slit 118 in tab 86 and engaging a holding member 122, which in turn is bolted down to the truck bed by through bolt 124.

The seat can be removed from the truck bed and used as a beach float, boat seat, and the like.

The seat cushions may be constructed of weatherproof materials and filled with a poly foam or air. Other suitable materials and configurations can be used, providing they use a similar hinge arrangement and vehicle body attaching means.

Particularly, while the specific flexible hinge arrangement described does offer improved lower back support and adjustability, it is not intended to be the sole embodiment. Other, simpler flexible hinges such as the one shown on the inflatable version, FIGS. 9 through 13, can be utilized to provide a functional truck bed seat.

Although all references and illustrations indicate a simple passenger seat, the same configurations can be embodied in multiple passenger seats.

While the invention has been specifically set forth, it is understood that one skilled in the art may realize other embodiments and features, therefore, one should look to the drawings, description and claims for a complete understanding of the invention.

I claim:

1. A removable inflatable seat for installation in the bed of a pickup truck, the seat being quickly and easily installed and removed, comprising:
    a one piece seat means having a seat cushion means, a backrest and a head rest connected by hinge means;
    said hinge means including a first hinge means connecting said seat cushion to said back rest, and a second hinge means connecting said back rest to said head rest, for folding said seat; and
    a pair of tab means extending from said first hinge means; said tab means having means for attaching said seat to a truck bed and to a seat belt means.

2. A removable inflatable seat as in claim 1 wherein said tab means include a plurality of aligned apertures for connecting one or more pairs of apertures with a slit, forming alternate slots to allow fitting various pickup truck bed heights.

3. A removable inflatable seat as in claim 2 wherein said means on a truck bed is a pair of eyelet bolts to which said slots in said tabs of said seat attach, and a seat belt means removably connected therewith, thereby securing said seat tabs to said eyelet bolts.

4. A removable inflatable seat as in claim 3 wherein an inflatable thigh support cushion means is positioned under said seat cushion for passenger comfort, and secured by slots to said eyelet bolts.

5. A removable inflatable seat as in claim 4, wherein said thigh support cushion means is connected to said seat cushion by a flexible flap means.

6. A removable inflatable seat as in claim 5 wherein said flap means includes pockets for personal articles.

7. A removable inflatable seat as in claim 6 wherein a protective mat is integrally formed with said thigh support cushion means to protect the seat against damage.

8. A removable inflatable seat as in claim 2 in which said apertures have adjustable straps engaging said apertures and bolts on said truck bed for holding said seat in position.

* * * * *